United States Patent

Ahmed et al.

[11] Patent Number: 5,924,103
[45] Date of Patent: Jul. 13, 1999

[54] WORKS-IN-PROGRESS IN AN INFORMATION MANAGEMENT SYSTEM

[75] Inventors: Rafi Ahmed, Sunnyvale; Umeshwar Dayal, Saratoga, both of Calif.

[73] Assignee: Hewlett-Packard Company, Palo Alto, Calif.

[21] Appl. No.: 08/815,229

[22] Filed: Mar. 12, 1997

[51] Int. Cl.⁶ .................................................. G06F 17/30
[52] U.S. Cl. ............................ 707/201; 707/100; 707/101
[58] Field of Search ............................... 345/344; 380/24; 707/103, 101, 100, 201

[56] References Cited

U.S. PATENT DOCUMENTS

| | | | |
|---|---|---|---|
| 5,220,501 | 6/1993 | Lawlor et al. | 380/24 |
| 5,283,829 | 2/1994 | Anderson | 380/24 |
| 5,297,026 | 3/1994 | Hoffman | 705/14 |
| 5,710,889 | 1/1998 | Clark et al. | 345/344 |

*Primary Examiner*—Wayne Amsbury
*Assistant Examiner*—Cheryl Lewis

[57] ABSTRACT

An information management system for managing the concurrent performance of multiple works-in-progress while providing atomicity, consistency, isolation, and durability among transactions involved in the works-in-progress. The information management system includes a database for persistently storing a set of data objects and a set of data changes targeted for the data objects. The information management system includes a library that provides a set of methods that enable an activity to persistently store the data changes in the database while maintaining a work-in-progress such that the data changes are concealed from a global view of the database until the work-in-progress is complete.

20 Claims, 9 Drawing Sheets

WORKS-IN-PROGRESS IN AN INFORMATION MANAGEMENT SYSTEM

BACKGROUND OF THE INVENTION

1. Field of Invention

The present invention pertains to the field of information management systems. More particularly, this invention relates to maintaining works-in-progress in an information management system.

2. Art Background

Information management systems including database systems are commonly employed in a wide variety of information management contexts. Typically, such information management systems provide persistent data storage for a set of one or more applications that perform work on the persistently stored data. Such applications usually interact with the persistently stored data using database transactions as a unit of work. Typically, such database transactions are required to satisfy the properties of atomicity, consistency, and durability along with a degree of isolation between transactions.

A classic example of the importance of such required properties of database transactions is found in the context of information management systems used in banking. For example, a banking database may include a record for each bank account wherein each record includes an account balance attribute that indicates the balance in the corresponding bank account. An example application for a banking system is an application for transferring funds from a first bank account to a second bank account. Such an application usually generates a database transaction that updates the account balance attribute of the first bank account to indicate a new lower account balance and that updates the account balance attribute of the second bank account to indicate a new higher account balance.

If such a database transaction is atomic, then no other applications that interact with the banking database can read the updated account balance of the first bank account before the second bank account is updated. If such a database transaction is not atomic, then it is possible for the overall sum of account balances in the system to appear to be either higher or lower than the actual account balances depending on the timing of the database transactions. As a consequence, it is critical for data integrity that such database transactions satisfy the property of atomicity and provide isolation between transactions.

One prior method for ensuring the isolation of a particular database transaction is to lock out database transactions from other applications while the particular database transaction is underway. For example, access to an entire database may be locked, or access to particular tables in a data base, or access to particular records being updated may be locked. Such lockouts are typically not noticeable by users if the database transactions are relatively brief.

However, in complex information management systems, it is often necessary to make data changes to a variety of data tables contained in a database. Often such changes include multiple pieces of work that must be completed by the user before it is appropriate for the data changes to be made globally accessible to other users and applications. Such an extended operation on a database system may be referred to as a work-in-progress. Such a work-in-progress may require time intervals of minutes, hours, or even days to complete. Yet such works-in-progress usually require some sort of controls for maintaining data integrity and consistency. Prior control methods that involve data locking are unacceptable for work-in-progress applications due to the extended time required to conduct such works-in-progress.

SUMMARY OF THE INVENTION

An information management system is disclosed for managing the concurrent performance of multiple works-in-progress while providing data integrity controls during suspend, resume, completion and discard operations involved with the works-in-progress. The information management system includes a database management system for persistently storing a set of data objects and a set of data changes targeted for the data objects. The information management system includes a library that provides a set of functions that enable each of a set of multiple activities to persistently store the data changes in the database while performing a work-in-progress such that the data changes are concealed from a global view of the database until the work-in-progress is complete.

The present information management system enables multiple pieces of work to be undertaken and persistently stored in a conceptually private work space for a user before it is appropriate for the data changes generated by the multiple pieces of work to be made globally accessible. The present information management system provides automatic query generation for conducting a work-in-progress data retrieval and enables long transactions with persistently stored data changes and non-blocking concurrency control. The user is shielded from the intricate details of various versions of data objects that simultaneously exist in the present information management system. A work-in-progress can deal with data objects that span several database tables and have arbitrarily complex inter-relationships with one another. The techniques disclosed herein are suitable for application to existing relational information systems without requiring changes in the underlying database management system.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
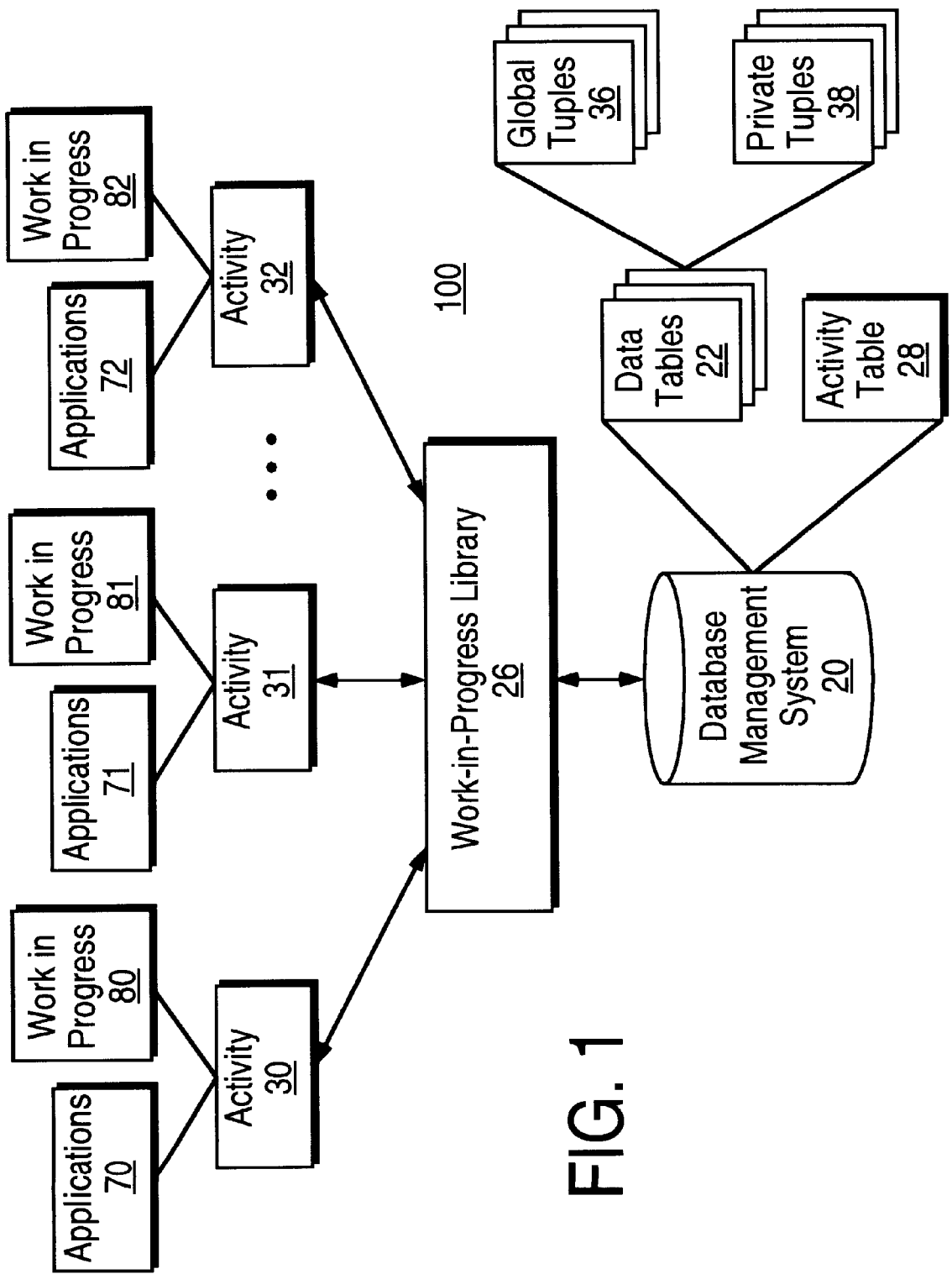
FIG. 1 illustrates an information management system for managing works-in-progress.

FIG. 1 illustrates an information management system 100 for managing works-in-progress. The information management system 100 includes a database a work-in-progress library 26 and a set of activities 30–32. The database management system 20 enables persistent storage of a set of data objects and a set of data changes targeted for the data objects. The work-in-progress library 26 provides a set of functions that enable the activity 30–32 to persistently store the data changes in the database management system 20 while performing a set of corresponding works-in-progress 80–82 such that the data changes for each activity 30–32 are concealed from a global view of the database management system 20 until the corresponding work-in-progress 80–82 is complete.

Each of the activities 30–32 represents a body of logically related work that a user performs by interacting with corresponding sets of applications 70–72. The applications 70–72 obtain data from the database management system 20, manipulate the data obtained from the database management system 20 and process user-entered data. The data associated with each of the activities 30–32 provides the corresponding work-in-progress 80–82.

Each of the activities 30–32 operates on global data and private data specific to the particular activity 30–32. Global data is data which is persistently stored in the database management system 20 and is visible to all of the activities 30–32. The global data in the database management system 20 provides a global view of the database management system 20. Private data is data that represents data changes to the contents of the database management system 20. Private data is visible only to the corresponding activity 30–32 that creates the private data. Each of the works-in-progress 80–82 represents private data that is persistently stored in the database management system 20.

The work-in-progress library 26 includes a set of methods which enable the activities 30–32 to persistently store both global and private data for the corresponding works-in-progress 80–82 into the database management system 20. The persistent storage provided by the work-in-progress library 26 enables a user to freely suspend incomplete ones of the activities 30–32 and later resume the incomplete ones of the activities 30–32 by restoring data associated with the corresponding incomplete works-in-progress 80–82.

The methods in the work-in-progress library 26 include methods for inserting data objects into the database management system 20, methods for modifying data objects in the database management system 20, methods for deleting data objects in the data base 20, and methods for resuming, completing, and discarding activities 30–32. The methods for inserting, modifying, and deleting data objects, and resuming, completing, and discarding activities shield the users of the activities 30–32 from the distinction between global data and private data changes in the database management system 20. In one embodiment, the data changes made by the activities 30–32 are recorded as a temporal history in the database management system 20. This embodiment readily enables subsequent retrieval of the temporal history of the data changes. This embodiment mimics the paper-world concept of striking-out data which is to be changed and writing in and initializing the new value.

The methods in library 26 include methods for completing the works-in-progress 80–82 by applying the private data changes associated with the activities 30–32 to the global view of the database management system 20. The work-in-progress library 26 also includes methods for discarding the works-in-progress 80–82 undertaken by the activities 30–32.

The methods of the work-in-progress library 26 ensure that the completion, resumption, as well as discard operations on the works-in-progress 80–82 are performed with data integrity controls. For example, a hardware failure during the execution of a completion operation on a particular one of the works-in-progress 80–82 will not result in partial and possibly inconsistent changes to the underlying data in the database management system 20. Instead, it will appear to the user as if the data changes undertaken in the completion process were never performed.

Figure 2:
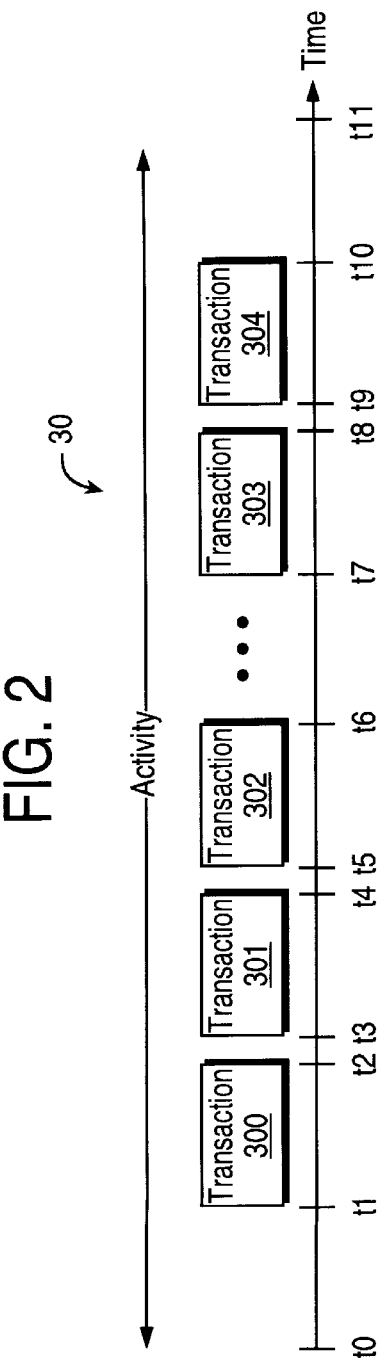
FIG. 2 is a time-line illustration of an activity that conducts a work-in-progress.

FIG. 2 illustrates the activity 30 which is undertaken over an extended time period between times t0 and t11. The activity 30 includes a series of transactions 300–304 each involving a manipulation of data targeted for the database management system 20. The methods provided in the library 26 provide consistent storage of the results of each of the transactions 300–302 in a conceptually private area of the database management system 20 for the activity 30.

Each transaction 300–304 commits the data changes to the private area of the database management system 20. For example, the transaction 300 commits at time t2 with an atomic update to its private area of the database management system 20. The methods for inserting, modifying, and deleting data objects provided by the library 26 perform the atomic updates of the database management system 20 while shielding the users from the distinction between private data and global data.

In this illustration, the methods in the library 26 enables users to suspend and resume the activity 30 between times $t_0$ and $t_{11}$ or to discard private data of the activity 30 at any time between $t_0$ and $t_{11}$ or after $t_{11}$. The methods in the library 26 also enable completion of the activity 30 at time $t_{11}$ or after $t_{11}$ with an atomic update of the database management system 20 that reveals the private data of the activity 30 to the global view.

The database management system 20 contains a set of data tables 22 for storing data objects associated with the works-in-progress 80–82 and an activity table 28. The data tables 22 provides consistent storage of global data objects in a set of global tuples 36 and private data objects in a set of private tuples 38. The global tuples and the private tuples may reside in the same data table. These data objects or data tuples may also be referred to as rows of the data tables 22. The global tuples 36 are accessible by all of the activities 30–32. Each private tuple 38 specifies a private activity-specific data change. Each private tuple 38 is accessible only by the corresponding activity 30–32 that created it.

Users may want to perform direct updates to the global tuples 36. A mechanism referred to as auto-completion is provided which allows direct updates by eliminating the intermediate stage of work-in-progress. At the end of an auto-complete activity, the data changes made by the activity become persistent as well as globally accessible. The user chooses auto-completion or work-in-progress mode at the time of starting a particular one of the activities 30–32.

The database management system 20 is a relational database management system (RDBMS) that provides transactions as the unit of work. A transaction satisfies the properties of atomicity, consistency, durability, and some degree of isolation. The database management system 20 generally provide three levels of isolation defined by the ANSI SQL standard. The database management system 20 stores data objects within individual records which are referred to as tuples.

The work-in-progress library 26 includes a set of methods that automatically generate SQL expressions given a set of input parameters from the activities 30–32 which describes the query mode, either work-in-progress or auto-complete, and which indicates the characteristics of the requested query and the type of operations to be performed.

The methods in the work-in-progress library 26 maintain information in an activity table 28. The activity table 28 contains information about each activity 30–32, which of the data tables 22 each activity 30–32 has updated, and the time of update.

The database management system 20 and work-in-progress library 26 may be implemented in a computer system including a multiprocessor computer system or may be implemented in a network of computers systems which are linked together with various communication mechanisms including network communication. The activities 30–32 may all be implemented on the same is computer system or systems as contain the database management system 20 or may be implemented on one or more other computer systems which are linked to the computer system or systems that provide the database management system 20.

Figure 3:
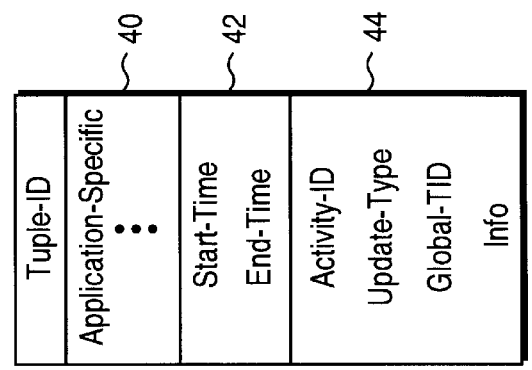
FIG. 3 illustrates the format of a record or tuple in the database of the information management system.

FIG. 3 illustrates a tuple 50 which is contained in the data tables 22. The tuple 50 includes a tuple identifier (Tuple-ID) attribute, a set of application-specific attributes 40, along with a set of temporal attributes 42 and a set of work-in-progress attributes 44.

The temporal attributes 42 include a START-TIME attribute and an END-TIME attribute. The START-TIME and the END-TIME attributes contain indications of the interval during which the tuple 50 contains the "current" data. The START-TIME attribute accommodate a value that represents the time when the tuple 50 is entered into the data tables 22 and the END-TIME attribute accommodate a value that represents the time when the tuple 50 ceases to be a valid current tuple due to a modification or a deletion. The END-TIME attribute also accommodate a special constant time-stamp value indication "NOW" which represents a current value of the system clock in the information management system 100. If the END-TIME attribute of the tuple 50 does not contain NOW, then the tuple 50 is considered to be archival data that represents the history of change.

The work-in-progress attributes 44 include an ACTIVITY-ID attribute, an UPDATE-TYPE attribute, a GLOBAL-TID attribute, and an INFO attribute. The ACTIVITY-ID attribute contains an activity identifier that indicates which of the activities 30–32 within which the data changes carried by the tuple 50 were generated. A zero value in the ACTIVITY-ID attribute indicates the tuple 50 is one of the global tuples 36.

The UPDATE-TYPE attribute indicates the type of update operation for the tuple 50. The UPDATE-TYPE attribute indicates an insertion, deletion, or modification operation for the tuple 50. The GLOBAL-TID attribute of each private tuple 38 contains the tuple identifier of a global tuple which that particular private tuple 38 deletes or modifies.

The INFO attribute of the tuple 50 contains a concatenation of symbols of all the modified attributes of the application-specific attributes 42. Each modifiable attribute of the application-specific attributes 42 is associated with a character symbol that is unique within a single one of the data tables 22.

Each update operation by the activities 30–32 (modification, insertion, and deletion) adds a tuple in the data tables 22. A tuple added to the data tables 22 for an insertion operation has no corresponding global tuple.

Figure 4:
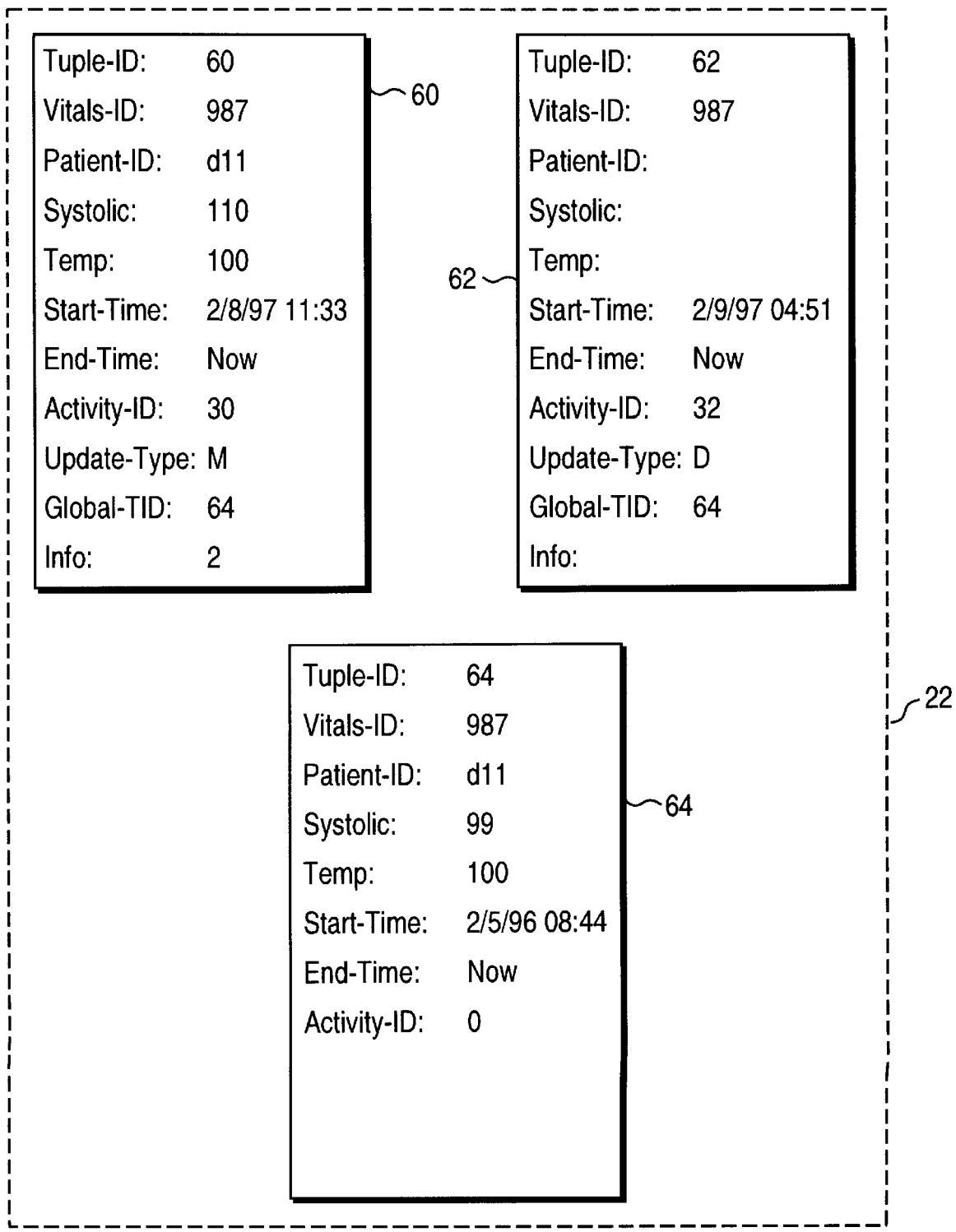
FIG. 4 illustrates examples of tuples and their references used in the information management system for managing works-in-progress.

FIG. 4 illustrate an example set of tuples 60–64 contained in one of the data tables 22. The tuples 60–64 each include the Tuple-ID attribute, having values 60, 62, and 64, respectively, along with the temporal attributes (START-TIME and END-TIME) and the work-in-progress attributes (ACTIVITY-ID, UPDATE-TYPE, GLOBAL-ID, and INFO). In this example, the application specific attributes of the tuples 60–64 relate to a medical information system and include a VITALS-ID, a PATIENT-ID, a SYSTOLIC, and a TEMP attribute.

The tuple 64 is one of the global tuples 38 as indicated by the value zero in its ACTIVITY-ID attribute.

The tuple 60 is one of the private tuples 38 that represents a private view of data held by the activity 30 as indicated by the value 30 in its ACTIVITY-ID attribute. The tuple 60 is added to the data tables 22 when the activity 30 modifies the value of attribute SYSTOLIC in the global tuple 64 from 99 to 110. The UPDATE-TYPE attribute "M" in the tuple 60 indicates a data change for a modification operation and the GLOBAL-TID attribute of 64 indicates that the modified data will apply to the global tuple 64. The symbols of attributes to be modified are contained in the INFO attribute in the tuple 60. In this example, the symbol "2" in the INFO attribute is the symbol for the SYSTOLIC attribute.

The tuple 62 is one of the private tuples 38 that represents a private view of data held by the activity 32 as indicated by the value 32 in its ACTIVITY-ID attribute. The tuple 62 represents data deleted by the activity 32 as indicated by the value "D" in its UPDATE-TYPE attribute. The tuple 62 is added to the data tables 22 when the activity 32 intends to delete the global tuple 64 as indicated by the value 64 in its GLOBAL-ID attribute.

Figure 5:
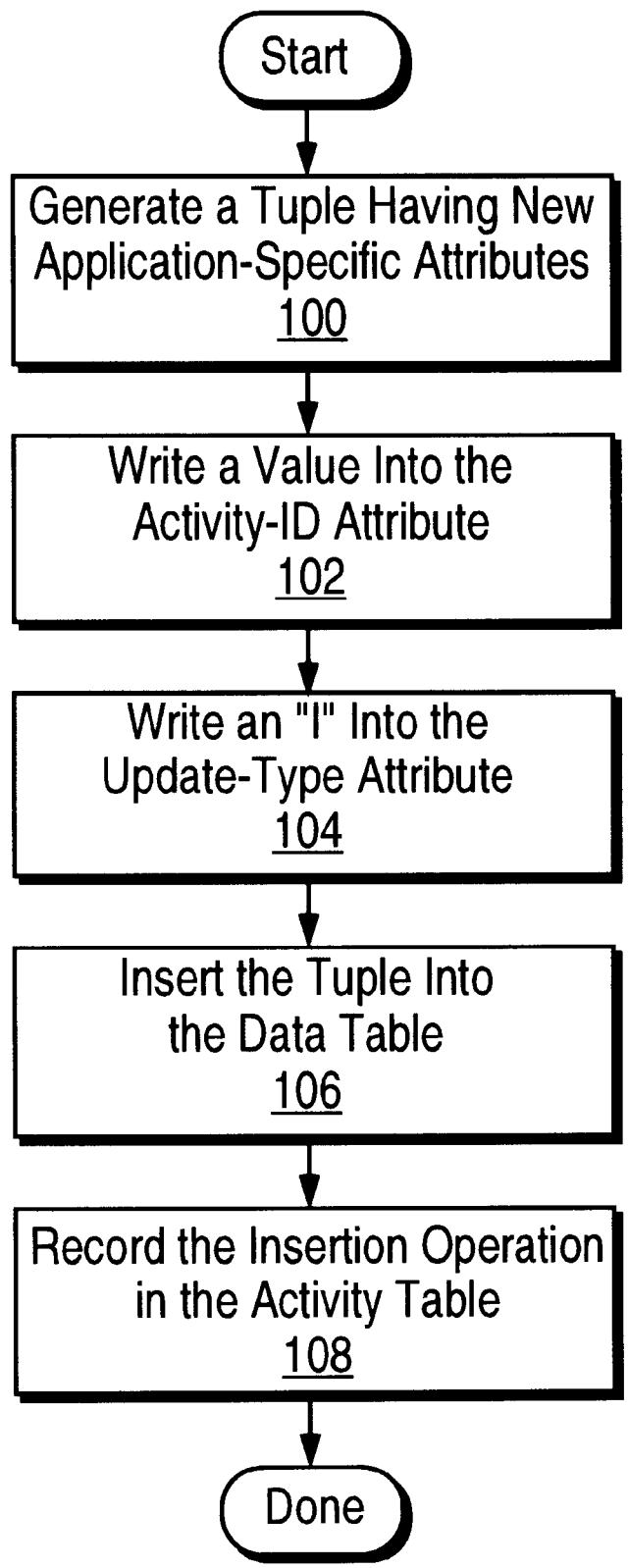
FIG. 5 illustrates a method in the work-in-progress library for inserting a data object into the database.

FIG. 5 illustrates a method in the work-in-progress library 26 for inserting a data object representing a new data item into the database management system 20. The method for inserting is used by the activities 30–32 to insert new private data into the database management system 20 without affecting the global view of the database management system 20 while the corresponding work-in-progress 80–82 are incomplete.

At step 100, a new tuple is generated that contains new data changes in its application-specific attributes. At step 102, a value is written to the ACTIVITY-ID attribute of the tuple generated at step 100 wherein the value indicates which of the activities 30–32 is to perform the insertion operation. At step 104, an "I" is written to the UPDATE-TYPE attribute of the tuple generated at step 100 to indicate an insertion operation. At step 106, the tuple generated at step 100 is inserted into one of the data tables 22. If a history of change is being maintained, then both the START-TIME and END-TIME attributes are assigned the current system time and the value "NOW," respectively before the new tuple is inserted at step 106.

At step 108, the insertion operation is recorded in the activity table 28. The activity table 28 is written to record the ACTIVITY-ID attribute written at step 102 and the name of one of the relevant data tables 22 and the current time.

Figure 6:
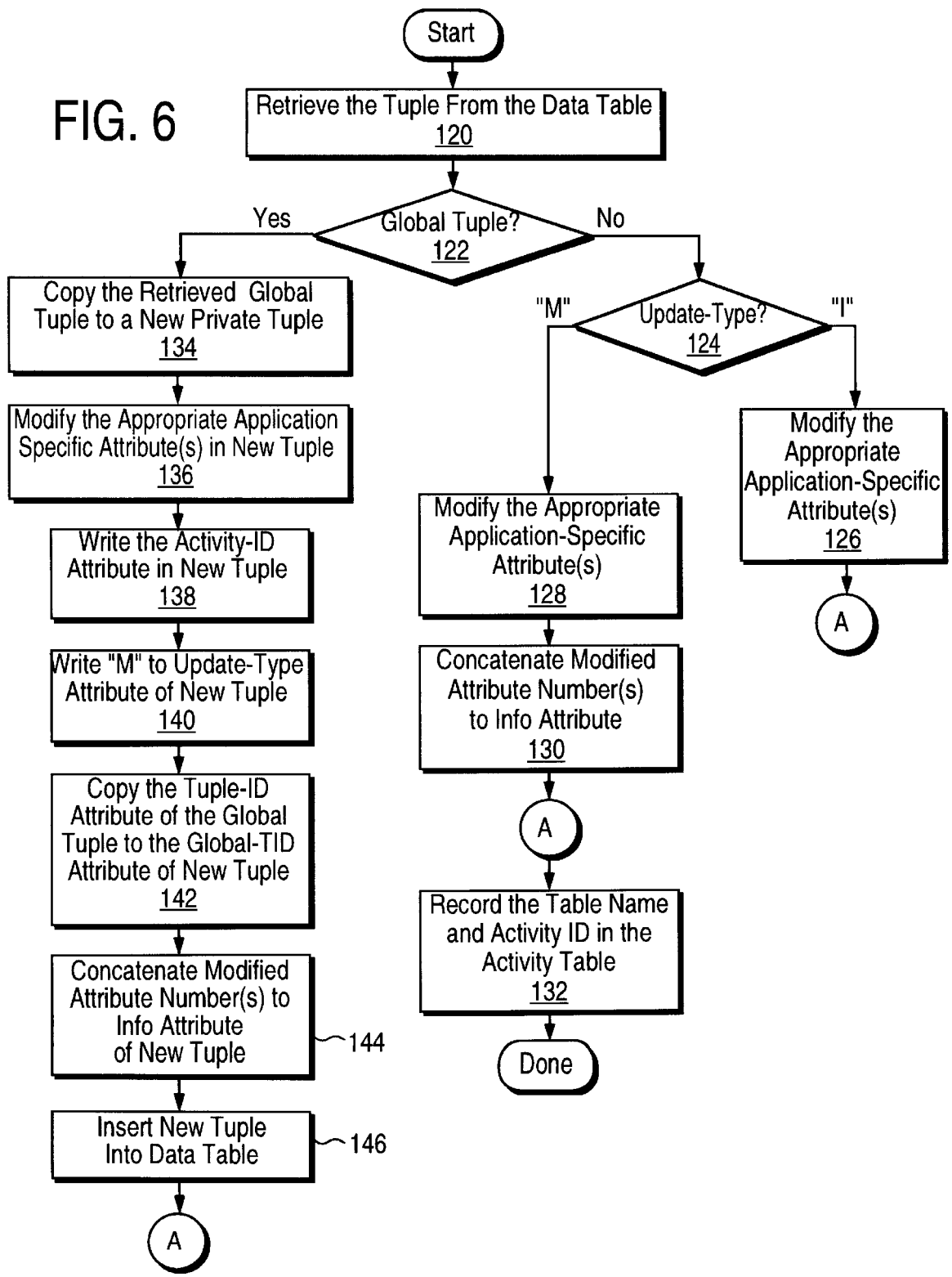
FIG. 6 illustrates a method in the work-in-progress library for modifying a data object in the database.

FIG. 6 illustrates a method in the work-in-progress library 26 for modifying a data object in the database management system 20. The method for modifying is used by the activities 30–32 to modify data in the database management system 20 without affecting the global view of the database management system 20 while the corresponding work-in-progress 80–82 is incomplete. At step 120, the tuple that is to be modified is retrieved from the relevant one of the data tables 22 using a generalized query.

At decision step 122, if the retrieved tuple is a global tuple as indicated by the ACTIVITY-ID attribute of the retrieved tuple then control proceeds to step 134. Otherwise, the retrieved tuple is a private tuple and control proceeds to decision step 124. An ACTIVITY-ID attribute equal to zero indicates a global tuple.

At step 134, the retrieved global tuple is copied to a new private tuple. At step 136, the application-specific attributes in the new tuple are modified as appropriate for the modify operation. At step 138, the ACTIVITY-ID attribute of the new tuple is written to indicate the activity that performs the modification operation. At step 140, an "M" is written to the UPDATE-TYPE attribute of the new tuple. At step 142, the Tuple-ID attribute of the retrieved global tuple is copied to the GLOBAL-TID attribute of the new tuple. At step 144, the attribute numbers of the modified application-specific attributes in the new tuple are concatenated to the INFO attribute of the new tuple if those attribute numbers are not already present in the INFO attribute. If a temporal history of changes is being recorded then the current time is written to the START-TIME attribute. At step 146, the new tuple is inserted into the data tables 22 and then control proceeds to step 132.

At decision step 124, if the UPDATE-TYPE attribute of the retrieved private tuple indicates "I" for inserted, then control proceeds to step 126 where the application-specific attributes in the retrieved private tuple are modified as appropriate for the modify operation. Control then proceeds to step 132.

If the UPDATE-TYPE attribute of the retrieved private tuple indicates "M" then control proceeds to step 128. At block 128, the application-specific attributes in the retrieved private tuple are modified as appropriate for the modify operation. Thereafter at block 130, the attribute numbers of the modified ones of the application-specific attributes in the retrieved private tuple are concatenated to the INFO attribute if those attribute numbers are not already present in the INFO attribute. If a temporal history of changes is being recorded then the current time is written to the START-TIME attribute. Control then proceeds to step 132.

At step 132, a record of the modification operation is written to the activity table 28. The record of modification includes the ACTIVITY-ID of the particular activity 30–32, the name of one of the relevant data tables 22, and the current time.

Figure 7:
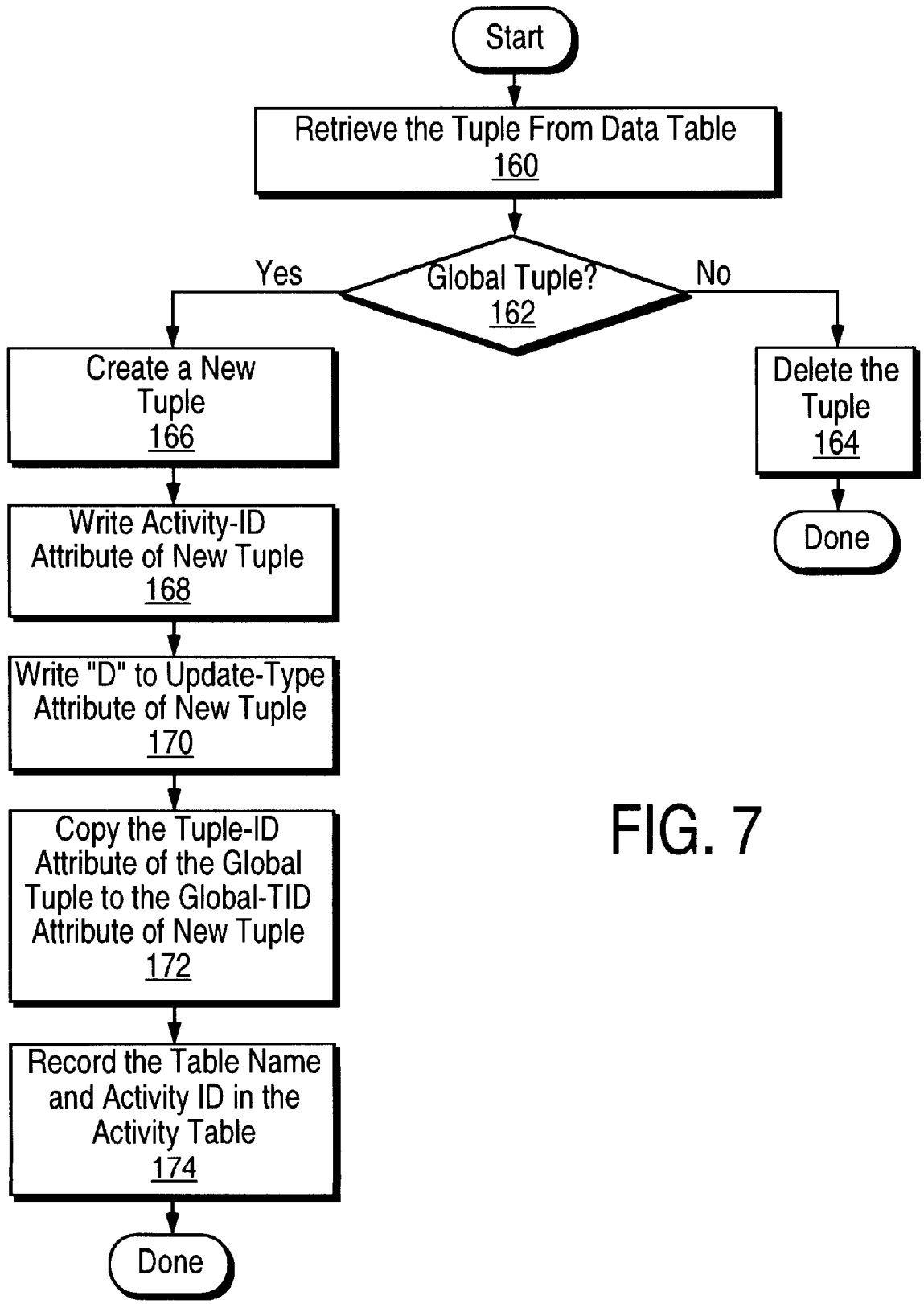
FIG. 7 illustrates a method in the work-in-progress library for deleting a data object in the database.

FIG. 7 illustrates a method in the work-in-progress library 26 for deleting a data object in the database management system 20. The deletion method is used by the activities 30–32 to delete data in the database management system 20 without affecting the global view of the database management system 20 while the corresponding work-in-progress 80–82 is incomplete.

At step 160, the tuple containing the data object to be deleted is retrieved from the data tables 22. At decision step 162, if the retrieved tuple is a global tuple as indicated by the ACTIVITY-ID attribute of the retrieved tuple then control proceeds to step 166. Otherwise, at step 164 the retrieved tuple is deleted from the data tables 22.

At step 166, a new tuple is generated and the ACTIVITY-ID attribute of the new tuple is written at step 168 to identify the particular one of the activities 30–32 which is requesting the deletion operation. At step 170, a "D" is written to the UPDATE-TYPE attribute of the new tuple. At step 172, the Tuple-ID attribute from the retrieved global tuple is copied to the GLOBAL-TID attribute of the new tuple. At step 174, a record of the deletion is written to the activity table 28 including the ACTIVITY-ID of the particular activity 30–32, the name of one of the relevant data tables 22, and the current time.

Figure 8A:
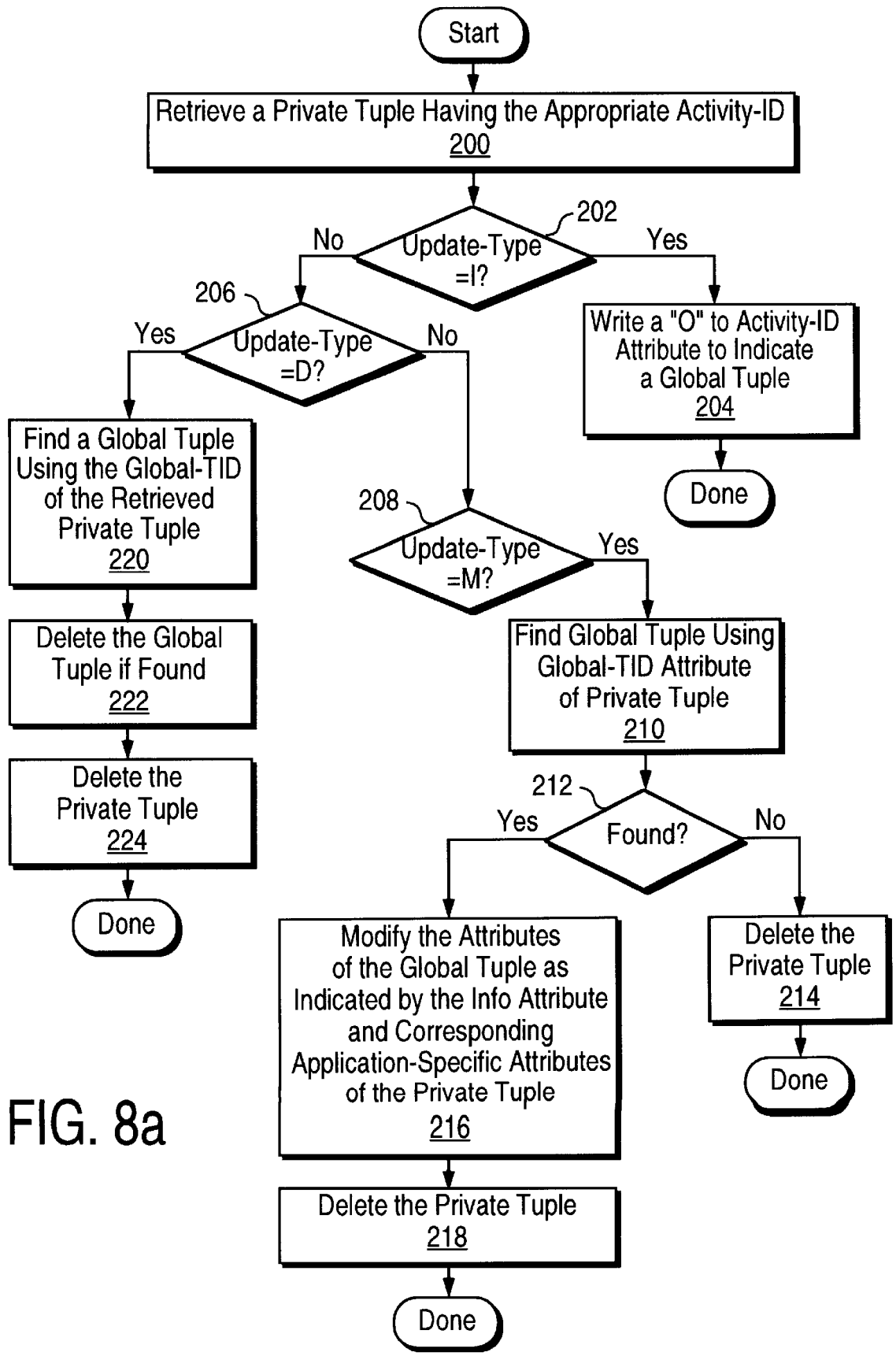
FIGS. 8a–8b illustrate a method in the work-in-progress library for completing a work-in-progress.
Figure 8B:
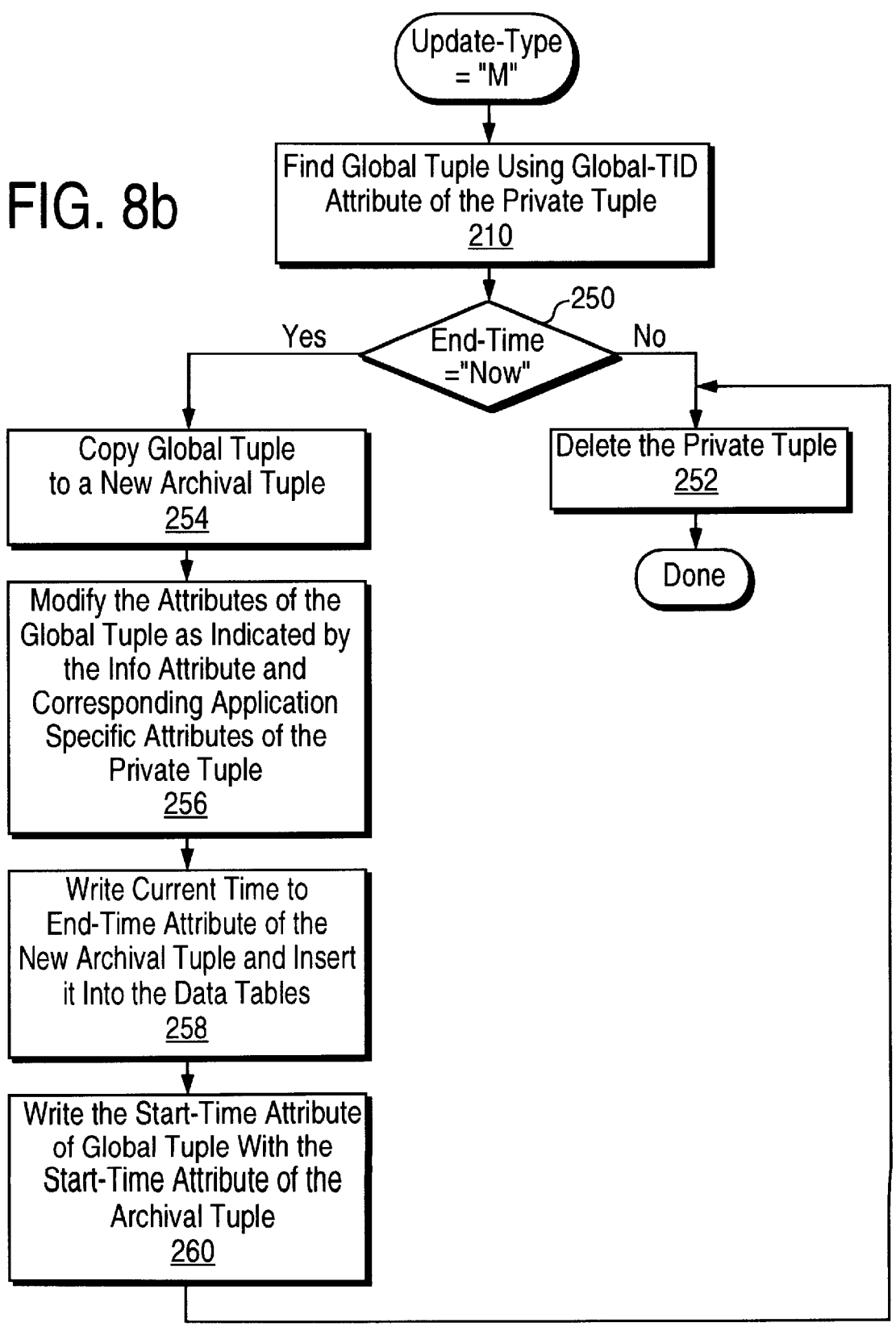

FIG. 8a illustrates a method in the work-in-progress library 26 for completing a work-in-progress. FIG. 8b illustrates a method in the work-in-progress library 26 for completing a work-in-progress with extensions for maintaining a temporal history of change. These methods for completing a work-in-progress is used by the activities 30–32 to make the data changes generated for the works-in-progress 80–82 globally accessible and publicly visible.

An activity identifier for the particular activity 30–32 requesting completion is used to retrieve in the temporal order from the activity table 28 the names of the data tables 22 whose members were updated by that activity. Steps 200–224 are performed for each tuple specified in the activity table 28 having an ACTIVITY-ID attribute that matches the particular activity 30–32 being completed.

At step 200, a private tuple having ACTIVITY-ID attribute that matches the particular activity 30–32 is retrieved from the data tables 22.

At decision step 202, if the UPDATE-TYPE attribute of the retrieved private tuple contains an "I" indicating an inserted tuple, then control proceeds to step 204. At step 204, a zero is written to the ACTIVITY-ID attribute of the retrieved private tuple to indicate that it is now a global tuple. If a history of changes is being recorded then the current time is assigned to the START-TIME attribute of the retrieved private tuple at step 204.

At decision step 206, if the UPDATE-TYPE attribute of the retrieved private tuple contains a "D" indicating a deleted tuple, then control proceeds to step 220. At step 220, a find operation is performed seeking a global tuple with a Tuple-ID attribute that matches the GLOBAL-TID attribute of the retrieved private tuple.

At step 222, if no temporal history is being maintained, then the global tuple sought at step 220 is deleted if found. If a temporal history is being maintained at step 222, then the global tuple is not deleted and the following step occurs. If the END-TIME attribute of the found global tuple is equal to "NOW," then its END-TIME attribute is written with the current time.

At block 224, the retrieved private tuple is deleted from the data tables 22.

At step 208, the UPDATE-TYPE attribute of the retrieved private tuple contains an "M" indicating a modified tuple, and control proceeds to step 210. At step 210, a find operation is performed seeking a global tuple with a TUPLE-ID attribute that matches the GLOBAL-TID attribute of the retrieved private tuple. The steps after step 210 depend on whether a history of changes is being maintained. If a history of changes is not being maintained then control proceeds to step 212. Otherwise control proceeds to step 250.

At step 212, if the global tuple is not found, then the retrieved private tuple is deleted at step 214. If the global tuple is found then control proceeds to block 216. At block 216, the application-specific attributes of the found global tuple that are specified in concatenated form in the INFO attribute of the retrieved private tuple are modified to reflect the changes contained in the retrieved private tuple. Thereafter, at block 218, the retrieved private tuple is deleted from the data tables 22.

At step 250, if the END-TIME attribute of the found global tuple does not indicate "NOW," then the retrieved private tuple is deleted at step 252. Otherwise, control proceeds to block 254. Otherwise, at block 254 the global tuple is copied to a new archival tuple. At block 256, the application-specific attributes of the found global tuple that are specified in concatenated form in the INFO attribute of the retrieved private tuple are modified to reflect the data changes contained in the retrieved private tuple. At block 258, the current system time is written to the END-TIME attribute of the new archival tuple and the new archival tuple is inserted into the data tables 22. At step 260, the START-TIME attribute of the archival tuple is copied to the START-TIME attribute of the retrieved global tuple. Thereafter, at block 252, the retrieved private tuple is deleted from the data tables 22.

As the last step of the completion operation, the activity table 28 is cleared of all entries having the ACTIVITY-ID of the particular activity 30–32 being completed.

Figure 9:
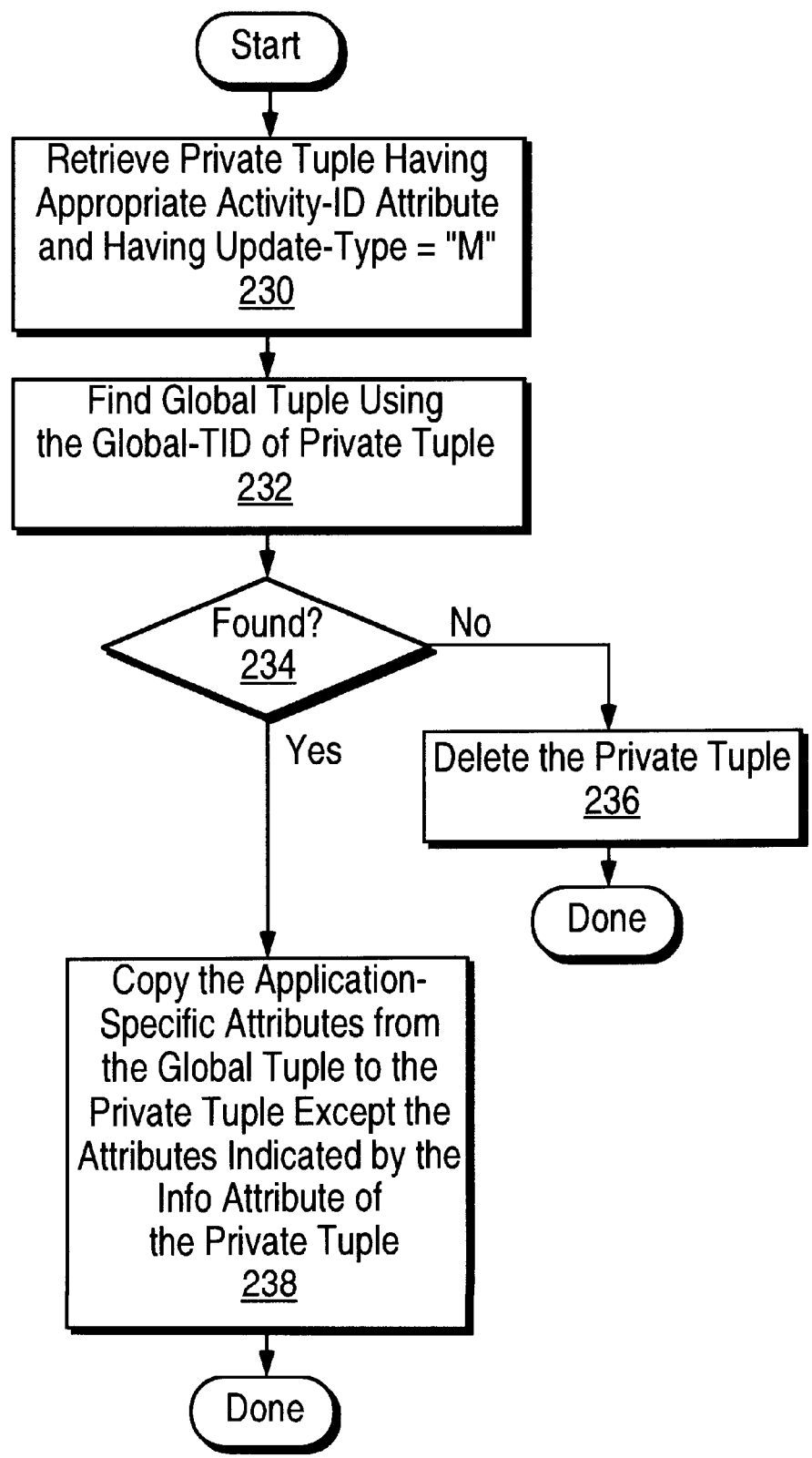
FIG. 9 illustrates the a method in the work-in-progress library for resuming a suspended work-in-progress.

FIG. 9 illustrates a method in the work-in-progress library 26 for resuming a suspended work-in-progress. Suspension of a particular one of the activities 30–32 involves freezing all the updates performed within the particular activity 30–32. Resumption involves reactivating the frozen data after any length of time. Resumption also involves the task of refreshing stale data values whose corresponding global data values are modified by other ones of the activities 30–32 which complete during the period of suspension.

Steps 230–238 are performed for each private tuple in the data tables 22 having an ACTIVITY-ID attribute that specifies the particular activity 30–32 being resumed and having an UPDATE-TYPE attribute that contains the "M" indication. At step 200, such a private tuple is retrieved from the data tables 22. At step 232, a find operation is performed seeking a global tuple with a Tuple-ID attribute that matches the GLOBAL-TID attribute of the retrieved private tuple. If such a global tuple is not found then the retrieved private tuple is deleted at step 236. If such a global tuple is found, then at step 238 the application-specific attributes except those that are indicated by the INFO attribute of the retrieved private tuple are copied from the found global tuple to the retrieved private tuple to refresh these attributes in the retrieved private tuple.

The user may decide that the data changes of one of the works-in-progress 80–82 are no longer appropriate and should be discarded. Data changes that have been discarded are permanently erased. The discarding of the work-in-progress 80–82 for one of the activities 30–32 restores the view of the underlying data contained in the database management system 20 to what it was before the discarded work-in-progress 80–82 was started. The global view of the database management system 20 remains unaffected by the discard operation.

To discard a particular activity 30–32, all of the tuples in the data tables 22 whose ACTIVITY-ID attribute matches the particular activity 30–32 being discarded are retrieved and deleted in a reverse temporal order. Thereafter, all entries in the activity table 28 having an ACTIVITY-ID that matches the particular activity 30–32 are deleted.

An activity-specific query retrieves data from the global workspace as well as activity-specific workspace that contains the updates performed within that activity. These queries are formulated as generalized SQL query expressions, which can correctly retrieve a particular tuple irrespective of whether it has undergone any update within the activity or not. An activity-specific query, therefore, must retrieve activity-specific tuples, if any, and ignore their corresponding global tuples and activity-specific deletion tuples. Table 1 summarizes the activity-specific query strategy.

TABLE 1

|  | Global | Activity-specific |
|---|---|---|
| Insertion | N/A | Retrieve |
| Deletion | Ignore | Ignore |
| Modification | Ignore | Retrieve |

The following is an example relational schema discussed earlier for a medical application. The table VITALS of the tables 22 has three attributes—a systolic blood-pressure, a temperature, and a patient identifier. It also has an attribute, complaints, which is stored in a separate table COMPLAINTS, since the schema is normalized. The schema is shown below:

vitals (tid, vitals$_{13}$id, systolic, temperature, patient-id, start-time, end-time, act__id, indic, RD__tid, info)

complaints (tid, complaint, vitals__id, start-time, end-time, act__id, indic, RD__tid)

SELECT *
FROM vitals V1
WHERE
  (V1.vitals__id=987 and V1.act__id=A33 and
  V1.indic!=D) or (V1.act__id=0 and V1.end-time='NOW'
  and V1.tid NOT IN
  (SELECT V2.RD__tid
  FROM vitals V2
  WHERE
    V2.vitals__id=987 and V2.act__id=A33 and
    V2.indic!=I))

A method for generating SQL query fragments as shown above for each table that maintains work-in-progress is set forth below. The query fragment is used as a conjunctive clause to other application specific "where" clause. The method refers to a table T that supports work-in-progress and which has been augmented with the following attributes: tid, act__id, indic, RD__tid, start__time and end__time.

X is the application specific conjunctive clause and Z is the act__id for which the query is being formulated. The output of the following method is W, a "where" clause that involves T. W is used by an application to form a full SQL query.

First, initialize W with the string "(X AND T.act__id='Z'".

Next, Concatenate "T.indic !='D') OR (T.activity__id='0'" to W. (An activity id equal to '0' indicates global tuples.)

If history of change is being maintained for T, then concatenate "T.end__time='NOW'" to W.

Next, concatenate "T.tid =NOT IN (SELECT S.RD__tid FROM T S" to W.

Next, create a new application specific clause by copying X to Y and substituting T with S in Y.

Finally, concatenate "WHERE Y and S.act__id='Z' and S.indic !='I'))"

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An information management system, comprising:
  database for persistently storing a set of data objects in a global view of the database and for storing a set of data changes targeted for the data objects in a private view of the database associated with an activity;

library that provides a set of methods that enable the activity to persistently store the data changes in the database while performing a work-in-progress such that the data changes are concealed from the global view of the database until the work-in-progress is complete.

2. The information management system of claim 1, wherein the data changes include a new data object and wherein the methods include a method for inserting the new data object into the database such that the new data object is concealed from the global view.

3. The information management system of claim 1, wherein the data changes include a set of modifications to one of the data objects and wherein the methods include a method for modifying the one of the data objects in the database such that the modifications to the data object are concealed from the global view.

4. The information management system of claim 1, wherein the data changes include a deletion of one of the data objects and wherein the methods include a method for deleting the one of the data objects in the database such that the deletion of the data object is concealed from the global view.

5. The information management system of claim 1, wherein the methods include a method for resuming the work-in-progress after a suspension such that the work-in-progress is refreshed with any updates to the global data objects that occurred after the suspension of the work-in-progress.

6. The information management system of claim 1, wherein the methods include a method for completing the work-in-progress such that the data changes for the work-in-progress are made visible to the global view.

7. The information management system of claim 1, wherein the methods include a method for discarding the data changes of the work-in-progress.

8. The information management system of claim 1, wherein the database is an existing relational data base having an augmented schema for managing the work-in-progress.

9. The information management system of claim 8, wherein the augmented schema comprises:
   activity identifier attribute that identifies the activity conducting the work-in-progress;
   update type attribute that specifies either an insertion, a deletion, or a modification data change;
   global identifier attribute that specifies the data objects that are targeted for the data changes;
   information attribute that specifies one or more attributes of the data object that are targeted for the data changes.

10. The information management system of claim 9, wherein the augmented schema further includes a set of temporal attributes for tracking a temporal history of the data changes.

11. An information management system for conducting a work-in-progress, comprising:
   database for persistently storing a set of data objects in a global view of the database and for storing a set of data changes targeted for the data objects in a private view of the database associated with the work-in-progress wherein the database provides an augmented schema for managing the work-in-progress;
   library that provides a set of methods that provide persistent storage of the data changes in the database during the work-in-progress such that the data changes are concealed from the global view of the database until the work-in-progress is complete.

12. The information management system of claim 11, wherein the augmented schema comprises:
   activity identifier attribute that identifies an activity that is conducting the work-in-progress;
   update type attribute that for holding either an insertion, a deletion, or a modification indication;
   global identifier attribute that specifies the data objects that are targeted for the data changes;
   information attribute that specifies one or more attributes of the data object that are targeted for the data changes.

13. The information management system of claim 12, wherein the augmented schema further includes a set of temporal attributes for tracking a temporal history of the data changes.

14. The information management system of claim 12, wherein the data changes include an insertion operation and wherein the methods include a method for performing the insertion operation by performing the steps of:
   creating a new data object including a set of application-specific attributes;
   writing the activity identifier attribute of the new data object to indicate an activity that is requesting the insertion operation;
   writing the update-type attribute of the new data object with the insertion indication;
   inserting the new data object into the database;
   recording the insertion operation in an activity table.

15. The information management system of claim 12, wherein the data changes include a modification operation on one of the data objects and wherein the methods include a method for performing the modification operation by performing the steps of:
   retrieving the one of the data objects from the database;
   if the one of the data objects is not concealed from the global view then copying the one of the data objects to a new data object, modifying a set of attribute-specific attributes in the new data object, writing the activity identifier attribute of the new data object to indicate an activity that is requesting the modification operation, writing the update-type attribute of the new data object with the modification indication, writing the global identifier attribute of the new data object to indicate the one of the data objects, concatenating a set of modified attribute numbers into the information attribute of the new data object, and inserting the new data object into the database;
   if the one of the data objects is concealed from the global view and if the update-type attribute of the one of the data objects indicates the modification operation, then modifying the attribute-specific attributes in the one of the data objects, and concatenating the modified attribute numbers into the information attribute of the one of the data objects;
   if the one of the data objects is concealed from the global view and if the update-type attribute of the one of the data objects indicates the insertion operation, then modifying the attribute-specific attributes in the one of the data objects;
   recording an activity identifier of the activity that is requesting the modification operation in an activity table.

16. The information management system of claim 12, wherein the data changes include a deletion operation on one of the data objects and wherein the methods include a method for performing the deletion operation by performing the steps of:

retrieving the one of the data objects from the database;

if the one of the data objects is not concealed from the global view then creating a new data object, writing the activity identifier attribute of the new data object to indicate an activity that is requesting the deletion operation, writing the update-type attribute of the new data object with the deletion indication, writing the global identifier attribute of the new data object to indicate the one of the data objects, and recording an activity identifier of the activity that is requesting the deletion operation in an activity table;

if the one of the data objects is concealed from the global view then deleting the one of the data objects from the database.

17. The information management system of claim 12, wherein the methods include a method for resuming the work-in-progress after a suspension by performing the steps of:

retrieving from the database one of the data objects concealed from the global view and having an activity identifier recorded in an activity table and having the modification indication in the update-type attribute;

finding one of the data objects not concealed from the global view using the global identifier attribute of the retrieved data object;

if the one of the data objects not concealed from the global view is not found in the database then deleting the one of the data objects concealed from the global view;

if the one of the data objects not concealed from the global view is found in the database then copying a set of application-specific attributes from the one of the data objects not concealed to the retrieved data object except for the application-specific attributes indicated in the information attribute of the retrieved data object.

18. The information management system of claim 12, wherein the methods include a method for completing the work-in-progress by performing the steps of:

retrieving from the database one of the data objects concealed from the global view and having an activity identifier recorded in an activity table;

if the update-type attribute of the retrieved data object contains the insertion indication then writing the one of the data objects to indicate that it is not concealed from the global view;

if the update-type attribute of the retrieved data object contains the deletion indication then finding one of the data objects not concealed from the global view using the global identifier attribute of the retrieved data object, deleting the one of the data objects found, and deleting the retrieved data object;

if the update-type attribute of the retrieved data object contains the modification indication then finding one of the data objects not concealed from the global view using the global identifier attribute of the retrieved data object, and deleting the retrieved data object if the one of the data objects not concealed is not found;

if the update-type attribute of the retrieved data object contains the modification indication then finding one of the data objects not concealed from the global view using the global identifier attribute of the retrieved data object, and if found modifying the application-specific attributes of the found data object as indicated by the application-specific attributes of the retrieved data object, and then deleting the retrieved data object.

19. The information management system of claim 12, wherein the methods include a method for discarding the work-in-progress by performing the steps of:

retrieving and deleting from the database all of the data objects having an activity identifier attribute that matches an activity being discarded;

deleting all entries in an activity table having a recorded activity identifier that matches the activity being discarded.

20. The information management system of claim 12, wherein the methods include a method for automatically formulating a query based upon the augumented schema.

* * * * *